United States Patent [19]
Dowdy et al.

[11] Patent Number: 5,761,896
[45] Date of Patent: Jun. 9, 1998

[54] HIGH EFFICIENCY METHOD TO BURN OXYGEN AND HYDROGEN IN A COMBINED CYCLE POWER PLANT

[75] Inventors: Thomas E. Dowdy, Orlando; Ronald L. Bannister, Winter Springs, both of Fla.

[73] Assignee: Westinghouse Electric Corporation, Pittsburgh, Pa.

[21] Appl. No.: 812,892

[22] Filed: Mar. 10, 1997

Related U.S. Application Data

[63] Continuation of Ser. No. 297,535, Aug. 31, 1994, abandoned.

[51] Int. Cl.$^6$ ............................... F02C 3/22; F02C 3/30
[52] U.S. Cl. .................... 60/39.05; 60/39.465; 60/39.55
[58] Field of Search .......................... 60/39.05, 39.12, 60/39.465, 39.53, 39.55, 748

[56] References Cited

U.S. PATENT DOCUMENTS

| | | | |
|---|---|---|---|
| 2,956,402 | 10/1960 | Rae | 60/39.465 |
| 4,054,028 | 10/1977 | Kawaguchi | 60/748 |
| 4,148,185 | 4/1979 | Somers | 60/39.465 |
| 4,419,863 | 12/1983 | Dvorak et al. | 60/748 |
| 4,845,940 | 7/1989 | Beer | 60/732 |
| 5,170,622 | 12/1992 | Cheng | 60/39.05 |
| 5,177,952 | 1/1993 | Stone | 60/39.05 |
| 5,233,826 | 8/1993 | Cheng | 60/39.05 |
| 5,271,216 | 12/1993 | Frutschi et al. | 60/39.05 |
| 5,312,699 | 5/1994 | Yanagi et al. | |
| 5,329,758 | 7/1994 | Urbach et al. | 60/39.05 |
| 5,331,806 | 7/1994 | Warkentin | 60/39.465 |

FOREIGN PATENT DOCUMENTS 1 170 842  7/1984  Canada.

Primary Examiner—Louis J. Casaregola

[57] ABSTRACT

Hydrogen is used as the fuel source in a gas turbine combined cycle power plant. The hydrogen may be combusted in either a mixture of compressed air and steam or a mixture of pure oxygen and steam. In either case, the work of compression associated with pressurizing the oxidant for the combustion process is considerably reduced since steam, rather than excess air, is used to moderate combustion temperature, as well as to cool the turbine components. The steam is produced by transferring heat from the turbine exhaust gas to feed water. Since no hydrocarbon fuel is used, fuel bound NOx is eliminated. Moreover, if pure oxygen is used, rather than air, for the combustion of the hydrogen, then the only emission from the power plant is water vapor, which may be condensed and returned to the cycle.

14 Claims, 5 Drawing Sheets

HIGH EFFICIENCY METHOD TO BURN OXYGEN AND HYDROGEN IN A COMBINED CYCLE POWER PLANT

This application is a continuation of application Ser. No. 08/297,535 filed Aug.31, 1994 abandoned.

BACKGROUND OF THE INVENTION

The present invention relates to a method of burning hydrogen in a gas turbine power plant. More specifically, the present invention relates to a combined cycle power plant in which hydrogen is burned as the fuel and steam is used for cooling.

A gas turbine is typically comprised of a compressor section that produces compressed air. Fuel is then mixed with and burned in a portion of this compressed air in one or more combustors. Traditionally, such combustors had a primary combustion zone in which an approximately stoichiometric mixture of fuel and air was formed and burned in a diffusion type combustion process. Additional air was introduced into the combustor downstream of the primary combustion zone to cool the hot combustion gas down to a temperature suitable for introduction into the turbine. Although the overall fuel/air ratio was considerably less than stoichiometric, the fuel/air mixture was readily ignited at start-up and good flame stability was achieved over a wide range in firing temperatures due to the locally richer nature of the fuel/air mixture in the primary combustion zone. From the combustor, the hot gas is then directed to a turbine section where it drives a rotor shaft to produce power.

Unfortunately, use of approximately stoichiometric fuel/air mixtures resulted in very high temperatures in the primary combustion zone. Such high temperatures promoted the formation of oxides of nitrogen ("NOx"), considered an atmospheric pollutant. During combustion, NOx is generated primarily from three sources—(i) the conversion of atmospheric nitrogen in the combustion air to NOx, typically referred to as "thermal NOx" (ii) the conversion of organically bound nitrogen compounds, such as $HN_3$ (ammonia) and HCN, in the fuel to NOx, and (iii) the reaction between atmospheric nitrogen and hydrocarbon fragments formed from the breakdown of hydrocarbons in the fuel, typically referred to as "prompt NOx". The rate of formation of NOx from atmospheric nitrogen is primarily dependent upon temperature, occurring only at temperatures in excess of approximately 1325° C. (2400° F.) in fuel lean mixtures. It is known that combustion at lean fuel/air ratios reduces NOx formation. However, such lean fuel/air mixtures are difficult to ignite and have poor flame stability.

Therefore, it would be desirable to develop a method of heating the working fluid in a gas turbine with a minimum amount of NOx generation and with good combustion characteristics.

Using hydrogen as the fuel would eliminate the prompt and fuel bound NOx generation since there would be no hydrocarbons. However, the use of hydrogen as a fuel for a gas turbine presents special problems. The adiabatic flame temperature of hydrogen approaches 2200° C. (4000° F.).

Therefore, a large amount of excess air would be required to cool the combustion gas down to the temperature suitable for introduction into the turbine, which, even for the most advanced turbines, is limited to 1150°–1510° C. (2100°–2750° F.). The additional work required in the compressor to compress this additional air flow would negatively impact the thermal efficiency of the gas turbine. Therefore, it would be desirable to develop a method for cooling the combustion gas produced by burning hydrogen without the need for large amounts of excess air.

Even when burning hydrogen, thermal NOx will be generated due to the temperatures involved in the combustion process. Combusting hydrogen in pure oxygen would eliminate all NOx since there would be no atmospheric nitrogen. Combustors for rocket engines have traditionally operated by combusting liquid hydrogen in liquid oxygen. However, gas turbines must operate for extended periods of time without deterioration of the combustor. Consequently, the problems of cooling the combustor in a gas turbine presents challenges not present in rocket combustors. This problem is exacerbated if, for reasons of economy and ease of handling and supply, compressed oxygen gas, rather than liquid oxygen, is used. Typically, rocket combustors rely on the low temperature of liquid oxygen for cooling.

Cooling of the turbine section would also be a problem when burning hydrogen in pure oxygen since, traditionally, air bled from the compressor is used to cool the turbine components.

The turbine section typically employs a plurality of alternating rows of stationary vanes and rotating blades. Since the vanes and blades are exposed to the hot gas discharging from the combustor, cooling these components is of the utmost importance. After introduction into the turbine, the cooling air flows through radial passages formed in the airfoil portions of the vanes and blades. Typically, a number of small axial passages are formed inside the vane and blade airfoils that connect with one or more of the radial passages so that cooling air is directed over the surfaces of the airfoils, such as the leading and trailing edges or the suction and pressure surfaces. After the cooling air exits the vane or blade it enters and mixes with the hot gas flowing through the turbine section.

This traditional cooling approach has a detrimental impact on the thermal efficiency of the gas turbine. Although the cooling air eventually mixes with the hot gas expanding in the turbine, since it bypasses the combustion process the work recovered from the expansion of the compressed cooling air is much less than that recovered from the expansion of the compressed air heated in the combustor. In fact, as a result of losses due to pressure drop and mechanical efficiency, the work recovered from the cooling air is less than that required to compress the air in the compressor. Thus, it would be desirable to cool the vanes and blades without the use of compressed air bled from the compressor. One approach suggested in the past has been to replace the compressed air with steam generated from exhaust heat.

It is therefore desirable to provide a method of burning hydrogen in a gas turbine power plant so as to produce a minimum of NOx while adequately cooling the combustor and turbine components.

SUMMARY OF THE INVENTION

Accordingly, it is the general object of the current invention to provide a method of burning hydrogen in a gas turbine power plant so as to produce a minimum of NOx while adequately cooling the combustor and turbine components.

Briefly, this object, as well as other objects of the current invention, is accomplished in a method of generating rotating shaft power, comprising the steps of (i) mixing a flow of fuel and a flow of a pressurized oxygen bearing fluid so as to form a combustible mixture, the fuel consisting essentially of pressurized pure hydrogen, (ii) combusting the combustible mixture in the presence of a first flow of steam so as to produce a flow of hot moist pressurized gas, (iii) expanding the flow of hot moist pressurized gas in a first turbine having a rotating shaft so as to produce a flow of hot moist expanded gas and shaft power, and (iv) transferring heat from the flow of hot moist expanded gas to a flow of feed water so as to generate steam, at least a first portion of the generated steam forming the first flow of steam. In one embodiment of the method, the oxygen bearing gas is pure oxygen.

In a preferred embodiment of the current invention, the steps of mixing the flow of pressurized hydrogen gas and the flow of a pressurized oxygen bearing fluid so as to produce the combustible mixture and combusting the combustible mixture in the presence of the first flow of steam comprises the steps of (i) introducing the flow of pressurized hydrogen gas into a combustion zone formed in a combustor by directing the flow of pressurized hydrogen gas into the combustor at a first location therein, (ii) mixing the first flow of steam into the pressurized oxygen bearing fluid so as to produce a flow of moist pressurized oxygen bearing fluid, (iii) introducing at least a first portion of the flow of moist pressurized oxygen bearing fluid into the combustion zone by directing the flow of moist pressurized oxygen bearing fluid into the combustor through a first annular passage thereof encircling the first location.

The current invention also encompasses a method of generating rotating shaft power comprising the steps of (i) mixing a first flow of pressurized hydrogen gas and a flow of a pressurized oxygen bearing fluid and a first flow of steam, (ii) combusting the first flow of pressurized hydrogen gas with the pressurized oxygen bearing fluid so as to produce a flow of hot moist pressurized gas, (iii) partially expanding the flow of hot moist pressurized gas in a first turbine having a first rotating shaft so as to produce a flow of hot moist partially expanded gas and shaft power, (iv) mixing a second flow of pressurized hydrogen gas into the moist partially expanded gas and combusting the second flow of pressurized hydrogen gas therein so as to produce a flow of reheated moist partially expanded gas, (v) further expanding the flow of reheated moist partially expanded gas in a second turbine having a second rotating shaft so as to produce a flow of hot moist further expanded gas and additional shaft power, and (vi) transferring heat from the flow of hot further expanded gas to a flow of feed water so as to generate steam, at least a first portion of the generated steam forming the first flow of steam.

DESCRIPTION OF THE PREFERRED EMBODIMENT

Figure 1:
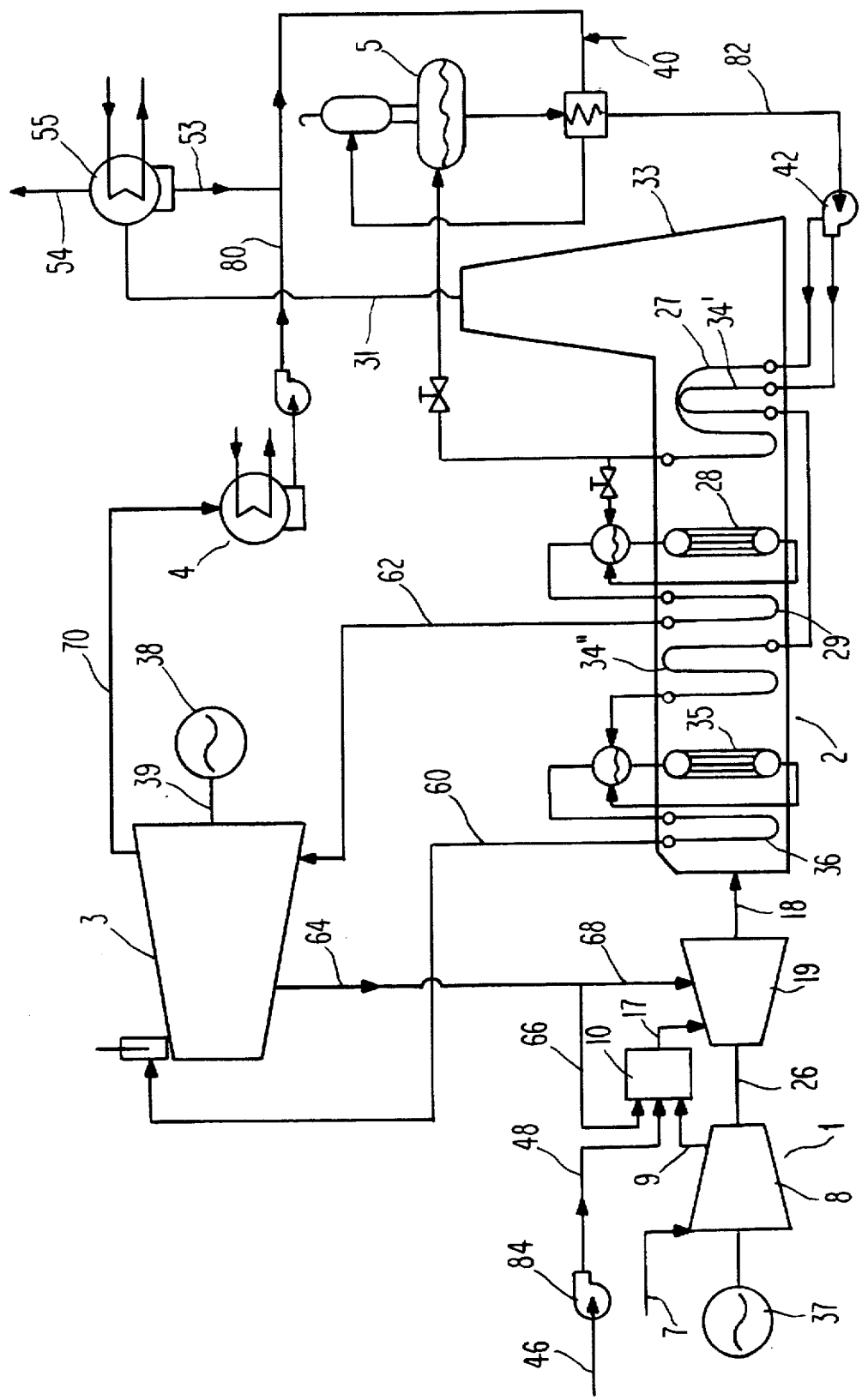
FIG. 1 is a schematic diagram of a first embodiment of the gas turbine power plant according to the current invention, in which hydrogen fuel is burned in air in a steam cooled combustor and the combustion gas is then expanded in a steam cooled turbine.

Referring to the drawings, wherein like numerals indicate like elements, there is shown in FIG. 1 a schematic diagram of a gas turbine combined cycle power plant. The primary components of the power plant are a gas turbine 1, a heat recovery steam generator ("HRSG") 2, a steam turbine 3, condensers 4 and 55, and a deaerator 5. The gas turbine is comprised of a compressor section 8, a combustion section 10, a turbine section 19 and a rotor 26 that extends through these three sections. The compressor is comprised of a plurality of alternating rows of stationary vanes and rotating blades. The vanes are affixed to a cylinder and the blades are affixed to discs mounted on the rotor. As is conventional, the combustion section is comprised of a cylinder that forms a chamber in which a plurality of combustors, discussed further below, and ducts are disposed. The turbine section is comprised of a plurality of alternating rows of stationary vanes and rotating blades. The vanes are affixed to an inner cylinder that is enclosed by an outer cylinder.

During operation, the compressor 8 inducts ambient air 7 and compresses it. The compressed air 9 from the compressor 8 is then directed to the combustion section 10. Hydrogen 46, which may be in either gaseous or liquid —i.e., cryogenic—form is also directed to the combustion section 10. If the hydrogen 46 is in gaseous form, a compressor 84 may be utilized to further pressurized the gas. In the combustion section 10, the pressurized hydrogen 48 is burned in a mixture of compressed air 9 and steam 66, as discussed further below, so as to produce a hot moist compressed gas 17 that is principally nitrogen and water vapor. The hot compressed moist gas 17 from the combustion section 10 is directed to the turbine section 19 and then expanded, thereby producing power in the rotor shaft 26 that drives the compressor 8.

The excess power from the turbine 19 beyond that required to drive the compressor 8 is used to drive an electric generator 37, thereby producing electrical power. The expanded moist gas 18 is then exhausted from the turbine 19.

Since the fuel is essentially pure hydrogen 46, NOx generation due to fuel bound nitrogen and prompt NOx are eliminated entirely. In addition, in order to minimize the generation of thermal NOx, the temperature of the hot combustion gas within the combustor is maintained below about 1660° C. (2900° F.). In conventional gas turbines, the gas combustion temperature is moderated by diluting the combustion gas with large amounts of compressed air drawn from the compressor 8 so that the overall fuel/air ratio is lean—that is, the ratio of the oxygen in the compressed air 9 to the fuel is considerably greater than that associated with stoichiometric combustion. Consequently, the compressor 8 must compress a considerable amount of excess air 7 and, in so doing, absorbs a large amount of the shaft power generated by the turbine section 19, thereby reducing the efficiency of the power plant. This problem is exacerbated when burning hydrogen because it has an adiabatic flame temperature of almost 2200° C. (4000° F.) and, hence, requires an even greater amount of diluent air than when burning conventional fuels.

In addition to the excess air used to moderate combustion gas temperature, conventional gas turbine compressors must also compress additional excess air that is used for cooling the components of the turbine section 19, as previously discussed, thereby further degrading efficiency.

According to the current invention, these problems are solved by using steam to both moderate the temperature of the combustion gas in the combustion section 10 and cool the components of the turbine section 19.

Thus, only the air necessary to ensure complete combustion of the hydrogen 48 need be compressed in the compressor 8.

The steam may be used to moderate the combustion temperature by mixing it into the compressed air 9 prior to its introduction into the combustor, as discussed below, or by injecting it directly into the combustor. According to the current invention, the steam is generated by recovering heat from the expanded gas 18 exhausted from the turbine 19. However, additional steam beyond that required for combustion temperature moderation and turbine cooling is produced in the HRSG 2 and expanded in the steam turbine 3 so as to generate additional shaft power, as discussed below.

Accordingly, in the preferred embodiment of the current invention, the expanded, but still relatively hot, gas 18 from the turbine section 19 is directed to the HRSG 2. The HRSG is comprised of a duct that encloses a plurality of heat transfer surfaces—specifically, a low pressure economizer 27, a low pressure evaporator 28, a low pressure superheater 29, a two-section high pressure economizer 34' and 34", a high pressure evaporator 35, and a high pressure superheater 36. Feed water 82 from the deaerator 5 is directed to the HRSG 2 by a two-stage feed pump 42. As the feedwater 82 flows over the heat transfer surfaces of the HRSG 2, the hot expanded gas 18 transfers heat to the feed water 82, thereby generating streams of high and low pressure superheated steam 60 and 62, respectively. The cooled expanded gas 31 from the HRSG 2 is then exhausted via a stack 33. Since the exhaust gas 31 is principally water vapor and nitrogen, the water vapor is recovered in the condenser 55, leaving a concentrated stream of nitrogen 54. The condensate 53 from the condenser 55 is returned to the cycle to reduce the amount of make up water 40 required. The nitrogen 54 can be utilized in chemical processes, such as ammonia production.

The streams of high and low pressure steam 60 and 62, respectively, are directed to the steam turbine 3, where they are expanded to produce power in a rotor shaft 39 that drives a second electrical generator 38, thereby producing additional electrical power. After being partially expanded, a portion 64 of the high pressure steam 60, which is now at an intermediate pressure, is extracted from the steam turbine 3. A first portion 66 of the extraction steam 64 is directed to the combustion section 10 for use in moderating combustion temperature, as discussed further below. A second portion 68 of the extraction steam 64 is directed to the turbine section 19 of the gas turbine for cooling the components therein using techniques well known in the art—see, for example, Canadian patent no. 1,170,842 (Rice), entitled "Steam Cooled Turbines," hereby incorporated by reference in its entirety.

The steam 70 not extracted from the steam turbine 3 is exhausted to the condenser 4, through which cooling water flows, where it is condensed. From the condenser 4, the condensate 80 is directed to the deaerator 5 where it is heated and deaerated. Make-up water 40, which compensates for the loss of the steam that is not returned to the cycle, is also directed to the deaerator 5.

According to one embodiment of the current invention, one or more multiple annular swirl type combustors 52 are utilized in the combustion section 10. Such a combustor is disclosed in U.S. Pat. No. 4,845,940 (Beer), hereby incorporated by reference in its entirety.

Figure 2:
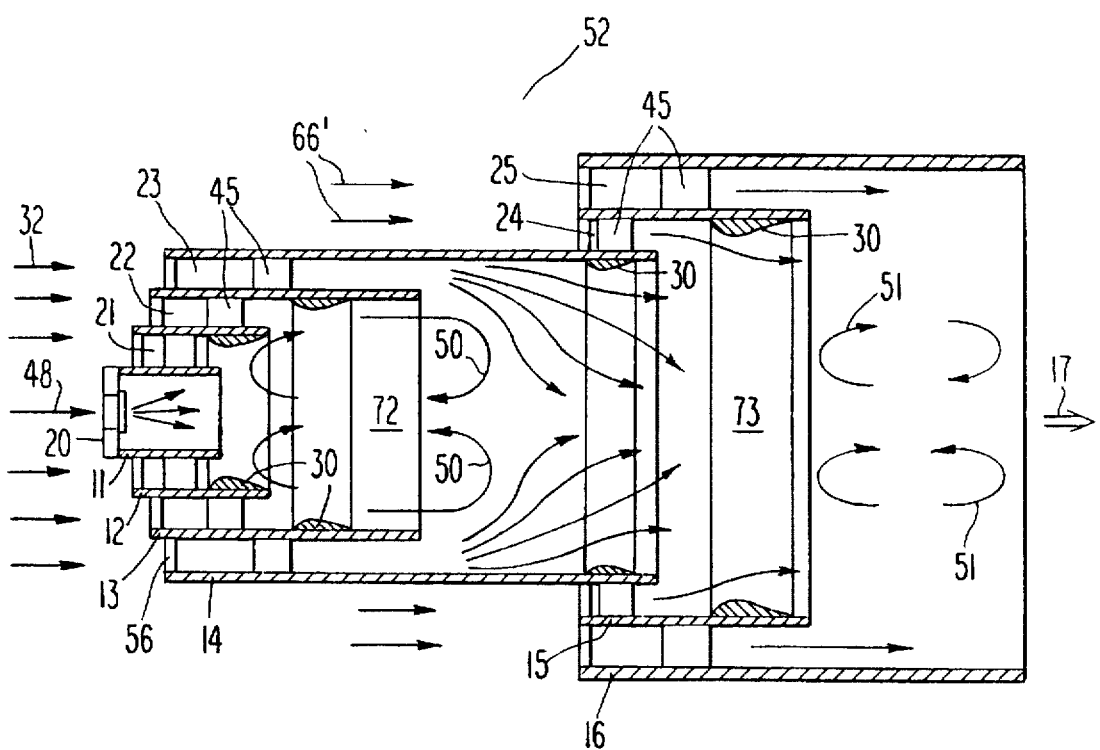
FIG. 2 is a longitudinal cross-section through the combustor shown in FIG. 1.

As shown in FIG. 2, preferably, the multiple annular swirl combustor 52 is comprised of six substantially cylindrical liners 11–16 that are concentrically arranged around the longitudinal center line of the combustor. Liner 13 encloses a first combustion zone 72, while liner 15 encloses a second combustion zone 73. The liners 11–16 are interconnected by struts 56 that give the combustor 52 a unitized structure.

The liners 11–16 form five axially extending annular passages 21–25 between themselves, each of which has an inlet. According to the preferred embodiment of the invention, the inlets of the three innermost annular passages 21–23 receive a mixture 32 of compressed air 9 from the compressor 8 and steam 66 extracted from the steam turbine 3, as previously discussed. Thus, the steam/air mixture 32 enters the combustor 52 as three annular streams that flow through the annular passages 21–23. Swirlers 45 are disposed in the annular passages 21–23 and impart a swirl to the incoming steam/air mixture 32 to aid in mixing with the pressurized hydrogen fuel 48. The inlets of the two outermost annular passages 24 and 25 receive a flow of pure steam comprised of a portion 66' of the extracted steam 66 supplied to the combustor. Swirlers 45 are also disposed in the annular passages 24 and 25 to impart a swirl to the steam 66' that improves its cooling ability.

The outlets of the annular passages 21–25 are staggered in the axial direction so that the outlets are displaced successively further downstream as the radii of the passages increases. Thus, the outlet of annular passage 22 is disposed downstream of the outlet of annular passage 21 that is encircled by annular passage 22, the outlet of annular passage 23 is disposed downstream of the outlet of annular passage 22 that is encircled by annular passage 23, etc. Generally, the outlets of the innermost annular passages 21 and 22 direct successive streams of the steam/air mixture 32 into the first combustion zone 72, the outlet of the middle annular passage 23 directs a stream of the steam/air mixture 32 into the downstream second combustion zone 73, and the outlets of the outermost annular passages 24 and 25 direct streams of pure steam 66' downstream of the second combustion zone 73.

Annular rings 30 are attached to the inside diameter of liners 12–15. Each of the rings 30 forms a radially inward extending projection that is shaped so as to create a converging/diverging passageway through the passages in which it is located. Consequently, the rings 30 serve to form toroidal vortices 50 and 51 that improve the stability of the combustor 52.

A fuel nozzle 20, disposed along the longitudinal axis of the combustor 52 at the upstream end of liner 11, serves to inject the hydrogen fuel 48 into the combustor 52. If necessary, the fuel may also be introduction at other locations around the combustor 52—for example, by circular manifolds, around which a plurality of fuel discharge ports are distributed, that are located upstream of one or more of the annular passages 21–23.

As a result of axially staggering the entrance of the steam/air mixture 32 into the combustor 52 through the annular passages 21–23 and by regulating the amount of steam/air mixture that enters each passage, the combustor can be operated with a rich fuel/air ratio in the first combustion zone 72 and a lean fuel/air ratio in the second combustion zone 73, as is conventional for multiple annular swirl burners, which are designed to minimize the conversion of fuel bound nitrogen to NOx. Such operation can also be advantageously used to control the combustion temperature and, hence, the formation of thermal NOx. However, since the combustion of fuel bound NOx does not occur when burning hydrogen according to the current invention, the combustor 52 can also be operated so that there is sufficient oxygen from the compressed air 9 in the steam/air mixture 32 to completely combust the available hydrogen 48 in both the first and second combustion zones 72 and 73, respectively.

Regardless of the distribution of the steam/air mixture 32 between the first and second combustion zones 72 and 73, the total flow rate of the steam/air mixture is regulated so that the amount of oxygen available is no more than about 115% that of stoichiometric conditions and, preferably, is approximately exactly stoichiometric. As a result, the amount of compressed air 9 that must be produced by the compressor is reduced. This advantageous situation is realized without generating high levels of thermal NOx by using the steam 66 to moderate the temperatures within the combustor 52 so that the temperature of the combustion gas leaving the first and second combustion zones is only approximately 1570° C. (2850° F.), below the level that will result in high rates of thermal NOx generation. The steam 66' that enters through the two outermost passages 24 and 25 further cools the combustion gas 17 to a temperature suitable for use in the turbine 19. The maximum turbine inlet temperature will depend on the turbine design—a typical inlet temperature for a modern turbine 19 is approximately 1325° C. (2400° F.).

Moreover, since the steam 68, rather than compressed air, is used to cool the turbine 19, the only air 7 that must be compressed by the compressor 8 is that required to ensure complete combustion of the hydrogen 48—that is, no more than about 115% of the air flow associated with stoichiometric combustion, and preferably about 100% of stoichiometric.

Figure 3:
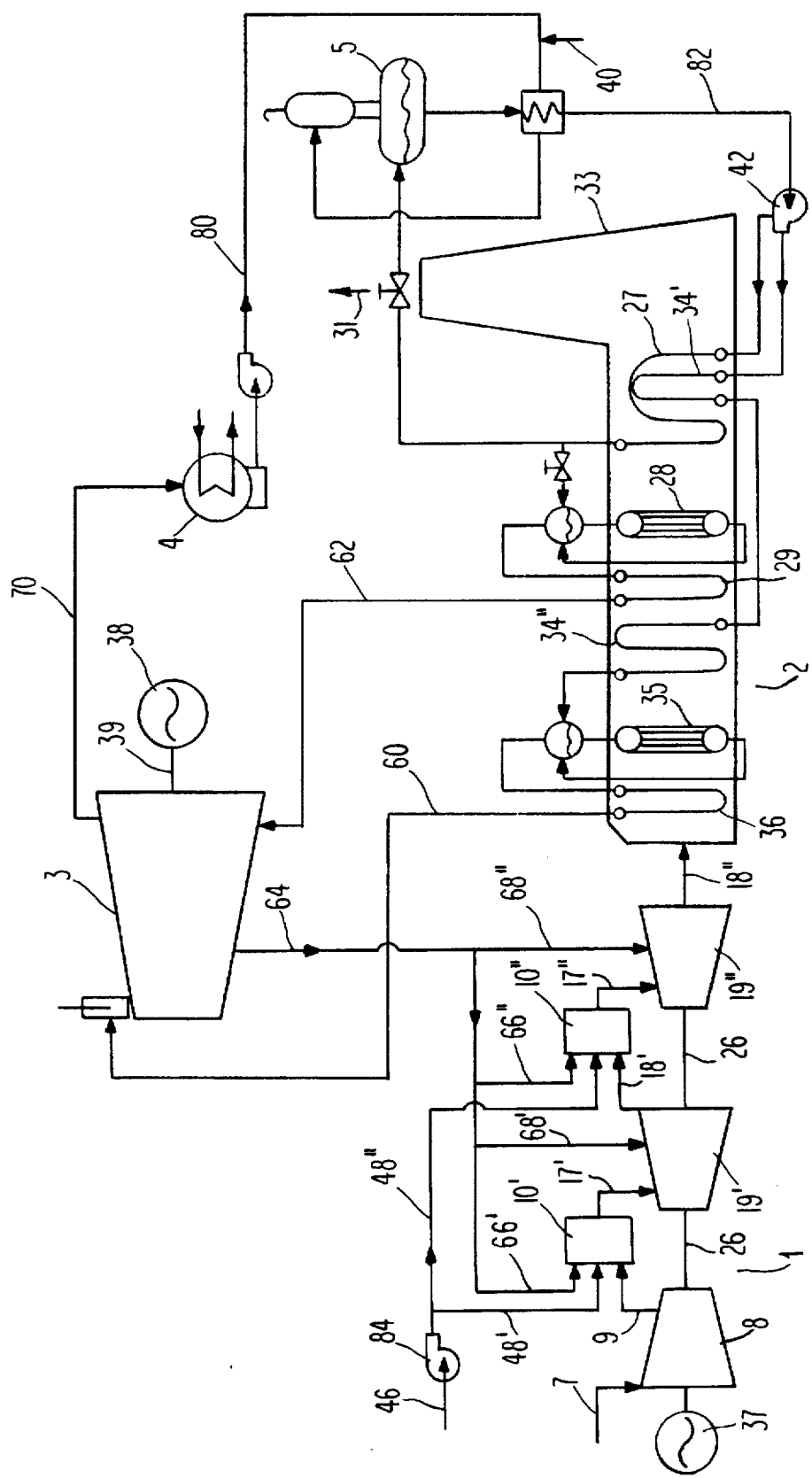
FIG. 3 is a schematic diagram of a second embodiment of the gas turbine cycle according to the current invention, in which a first portion of hydrogen fuel is burned in air in a steam cooled primary combustor and the combustion gas is expanded in a steam cooled high pressure turbine, and a second portion of hydrogen fuel is burned in expanded gas from the high pressure turbine in a steam cooled re-heat combustor and the reheated combustion gas is expanded in a steam cooled low pressure turbine.

FIG. 3 shows another embodiment of the current invention, in which the combustion of hydrogen 46 occurs in two stages. Thus, a first portion 48' of the pressurized hydrogen is burned in a first combustion section 10' in a mixture of compressed air 9 and steam 66' as before, except that the ratio of the compressed air in the steam/air mixture 32 in the first combustion section 10' is considerably in excess of that associated with the stoichiometric combustion of the first portion of the hydrogen 48' and, preferably, is at least 150% of that associated with stoichiometric combustion. The moist hot compressed gas 17' from the first combustion section 10', which still contains a significant amount of oxygen, is then partially expanded in a high pressure turbine 19'. As before, the high pressure turbine 19' is cooled by a portion 68' of the steam 64 extracted from the steam turbine 3.

From the high pressure turbine 19', the hot moist partially expanded gas 18', which is essentially air, water vapor and nitrogen and may be at a temperature of about 870° C. (1600° F.), is then directed to a reheat combustion section 10" where it is mixed with another portion 66" of the extract steam 64, similarly to that previously discussed. The excess oxygen in this steam/gas mixture provides the oxygen for the combustion of the second portion 48" of the pressurized hydrogen in the reheat combustion section 10", which raises the temperature of the gas back up to a level that suitable for optimum power output in the low pressure turbine 19", which is also steam cooled by steam 68".

Multiple annular swirl type combustors 52, such as that previously discussed, may be used for the primary and reheat combustors 10' and 10" and is especially well suited for use in the reheat combustor 10" to achieve efficient combustion using a hot partially oxygen depleted gas, such as that discharging from the high pressure turbine 19'. As before, the ratio of compressed air 9 to the total of both flows of compressed hydrogen 48' and 48" is regulated so that the overall ratio of oxygen to hydrogen is no more than about 115% of that associated with stoichiometric combustion, and preferably about 100%. Again, this is most advantageously achieved by relying exclusively on the extracted steam 64 for combustion temperature moderation and turbine cooling.

Figure 4:
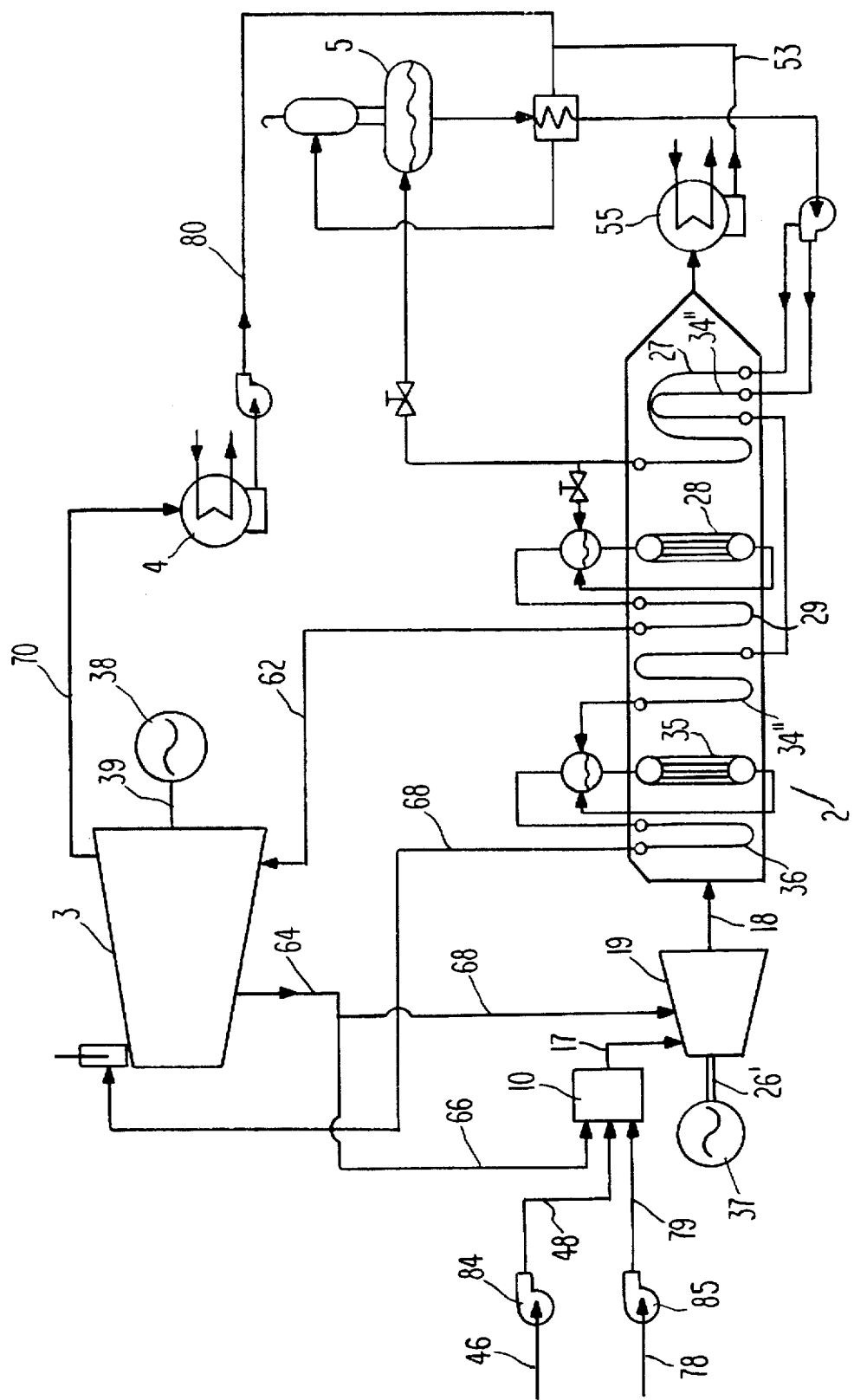
FIG. 4 is a schematic diagram of a third embodiment of the gas turbine cycle according to the current invention, in which hydrogen fuel is burned in oxygen in a steam cooled combustor and the combustion gas is then expanded in a steam cooled turbine.

FIG. 4 shows another embodiment of the current invention in which hydrogen 46 is burned in essentially pure oxygen 78, which may be in either gaseous or liquid—i.e., cryogenic—form. If the oxygen 78 is in gaseous form, a compressor 85 may be utilized to further pressurized the gas. However, the energy required to compress the pure oxygen 78 is considerably less than that associated with the compression of ambient air 7 in the previously discussed embodiments. Consequently, the thermal efficiency of the power plant is improved. This is so because, for a given amount of fuel; the mass flow of the oxidizing agent is considerably less when using pure oxygen rather than air. However, if the oxygen is liquid, a gas compressor is not required. Thus, the thermal efficiency of the power plant is increased even further.

In the combustion section 10, a mixture of pure pressurized oxygen 79 and steam 66 is formed and combusted with the pressurized hydrogen 48, as before. Also, the flow rate of the oxygen 79 is regulated so that, as before, approximately stoichiometric combustion is achieved—that is, the ratio of oxygen to hydrogen in no more than about 115% of the stoichiometric ratio and is preferably about 100%. Due to the cooling that results from the use of cryogenic oxygen, if such oxygen is used, the amount of steam 66 utilized for moderation of the combustion temperatures can be reduced. Again a multiple annular swirl type combustor 52, such as that previously discussed, may be advantageously used.

In this embodiment, the combustion of the essentially pure hydrogen 48 and oxygen 79 produces a hot gas 17 that is merely superheated, pressurized water vapor. Consequently, NOx generation is reduced to zero. Moreover, a condenser 55 installed at the exhaust of the HRSG 2 can be utilized to condense the water vapor, which can be returned to the cycle as condensate 53, as shown in FIG. 4. As a result, the emissions of the power plant are essentially zero.

Figure 5:
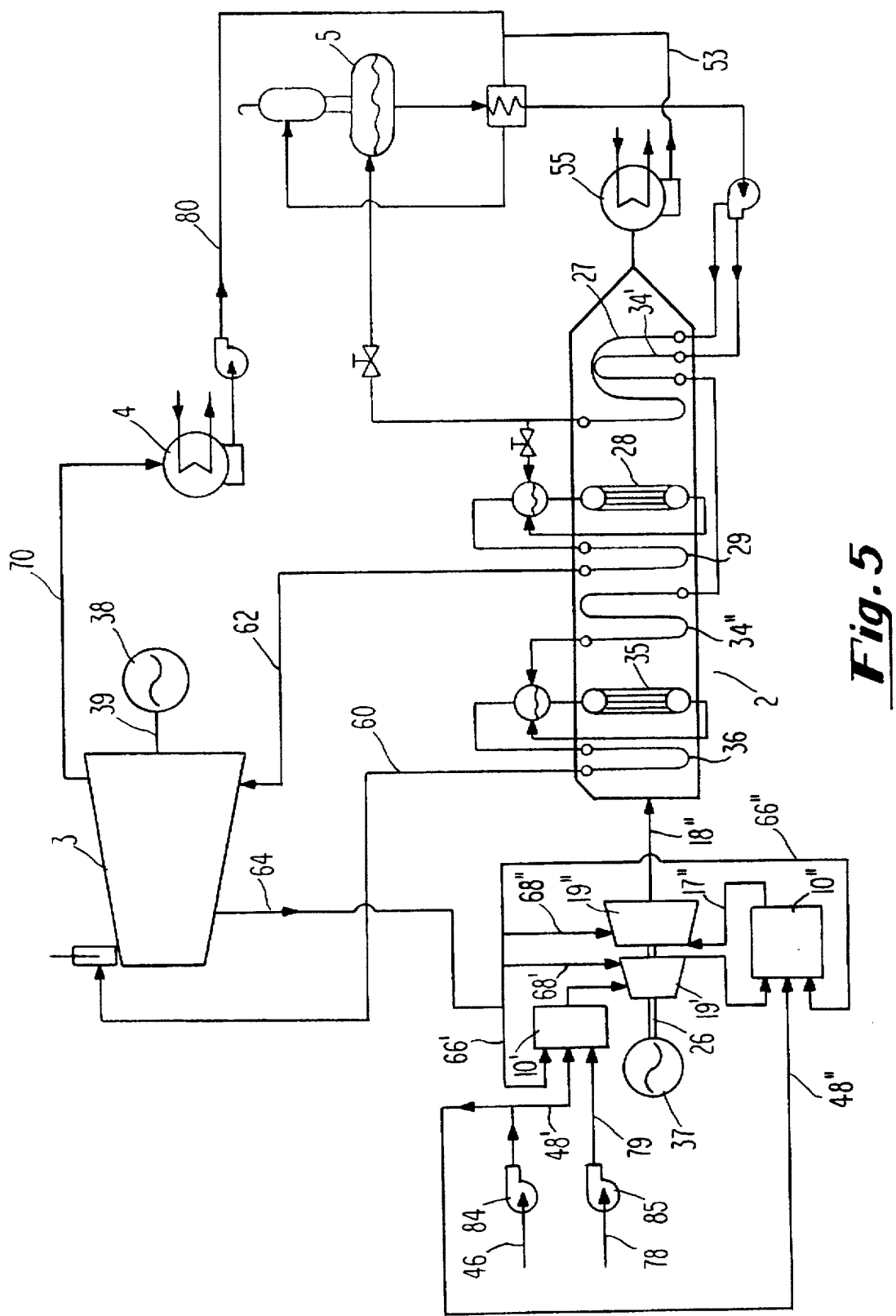
FIG. 5 is a schematic diagram of a fourth embodiment of the gas turbine cycle according to the current invention, in which a first portion of hydrogen fuel is burned in oxygen in a steam cooled primary combustor and the combustion gas is expanded in a steam cooled high pressure turbine, and a second portion of hydrogen fuel is burned in expanded gas from the high pressure turbine in a steam cooled re-heat combustor and the reheated combustion gas is expanded in a steam cooled low pressure turbine.

FIG. 5 shows still another embodiment of the current invention in which hydrogen and pure oxygen are burned, similar to the embodiment of FIG. 4, in a two-stage combustion process, similar to the embodiment of FIG. 3, utilizing primary and reheat combustion sections 10' and 10", respectively, and high and low pressure turbines 19' and 19", respectively.

As shown in FIG. 5, a first portion 48' of the pressurized hydrogen is burned in a first combustion section 10' in a mixture of compressed oxygen 79 and steam 66', with the amount of compressed oxygen in the steam/oxygen mixture in the first combustion section 10' being considerably in excess of that associated with the stoichiometric combustion of the first portion of the hydrogen 48' and, preferably, at least 150% of that associated with stoichiometric combustion. The moist hot compressed oxygen and water vapor from the first combustion section 10' is then partially expanded in a high pressure turbine 19', which is cooled by a portion 68' of the steam 64 extracted from the steam turbine 3, and the oxygen and water vapor are then reheated and expanded. Again, multiple annular swirl type combustors 52, such as that previously discussed, may be used for the primary and reheat combustors and is especially well suited for use in the reheat combustor 10".

The present invention may be embodied in other specific forms without departing from the spirit or essential attributes thereof and, accordingly, reference should be made to the appended claims, rather than to the foregoing specification, as indicating the scope of the invention.

We claim:

1. A method of generating rotating shaft power, comprising the steps of:
    a) introducing a flow of fuel consisting essentially of pure pressurized hydrogen into a combustion zone formed in a combustor by directing said flow of pressurized hydrogen into said combustor at a first location therein;
    b) mixing a first flow of steam into a flow of a pressurized oxygen bearing fluid so as to produce a flow of moist pressurized oxygen bearing fluid;
    c) introducing at least a first portion of said flow of moist pressurized oxygen bearing fluid into said combustion zone by directing said flow of moist pressurized oxygen bearing fluid into said combustor through a first annular passage thereof encircling said first location;
    d) mixing said flow of pressurized hydrogen and said flow of moist pressurized oxygen bearing fluid in said combustion zone so as to produce a combustible mixture;
    e) combusting said combustible mixture, thereby producing a flow of hot moist pressurized gas;
    f) expanding said flow of hot moist pressurized gas in a first turbine having a rotating shaft so as to produce a flow of hot moist expanded gas and shaft power; and
    g) transferring heat from said flow of hot moist expanded gas to a flow of feed water so as to generate steam, at least a first portion of said generated steam forming said first flow of steam used to produce said flow of moist pressurized oxygen bearing fluid.

2. The method according to claim 1, wherein said oxygen bearing fluid consists essentially of pure oxygen.

3. The method according to claim 2, wherein said hot moist pressurized gas and said hot moist expanded gas each consist essentially of pure water vapor.

4. The method according to claim 3, further comprising the step of condensing said flow of hot moist expanded gas so as to form at least a portion of said flow of feed water.

5. The method according to claim 1, further comprising the step of expanding a second portion of said generated steam in a second turbine having a second rotating shaft, thereby producing additional shaft power.

6. The method according to claim 1, further comprising the step of directing a second portion of said generated steam to said first turbine for cooling therein.

7. The method according to claim 6, wherein said oxygen bearing fluid is compressed air, and further comprising the step of compressing ambient air in a compressor so as to produce said compressed air.

8. The method according to claim 7, wherein substantially all of said oxygen in said compressed air produced by said compressor is combusted in said combustion of said combustible mixture.

9. The method according to claim 7, wherein the ratio of said oxygen in said compressed air produced by said compressor to said hydrogen in said combustible mixture is not greater than approximately 115% of the stoichiometric ratio of oxygen and hydrogen.

10. The method according to claim 1, wherein said combustor has a longitudinal axis, and wherein said first location is disposed along said longitudinal axis.

11. The method according to claim 1, wherein the steps of mixing said flow of fuel and said flow of a pressurized oxygen bearing fluid and combusting said combustible mixture in the presence of said first flow of steam comprise the further step of introducing a second portion of said flow of moist pressurized oxygen bearing fluid into said combustion zone by directing said second portion of said flow of moist pressurized oxygen bearing fluid into said combustor through a second annular passage therein, said second annular passage having a larger diameter than said first annular passage.

12. The method according to claim 11, wherein said second annular passage has an outlet disposed downstream from said first annular passage.

13. The method according to claim 1, further comprising the step of introducing a second portion of said generated steam through a second annular passage encircling said first annular passage and located downstream of said combustion zone.

14. The method of claim 1, further comprising the step of:
    mixing a second flow of fuel into said flow of hot moist expanded gas;
    combusting said second flow of fuel to produce a flow of reheated moist partially expanded gas;
    expanding said flow of reheated moist partially expanded gas in a second turbine to produce a flow of hot moist further expanded gas and additional shaft power; and
    transferring heat from said flow of hot moist further expanded gas to a second flow of feedwater to generate a second flow of generated steam, at least a first portion of said second flow of generated steam forming said first flow of steam.

* * * * *